United States Patent [19]

Nishimura et al.

[11] Patent Number: 5,436,439
[45] Date of Patent: Jul. 25, 1995

[54] BAR CODE READER FOR PROCESSING A PLURALITY OF BAR CODES IN A READ AREA

[75] Inventors: Mikiya Nishimura; Kazuo Ishii, both of Tokyo, Japan

[73] Assignee: NEC Corporation, Tokyo, Japan

[21] Appl. No.: 73,560

[22] Filed: Jun. 9, 1993

[30] Foreign Application Priority Data

Jun. 11, 1992 [JP] Japan ................... 4-151639

[51] Int. Cl.⁶ .................................................. G06K 7/10
[52] U.S. Cl. ................................... 235/462; 235/440
[58] Field of Search .............. 235/462, 436, 440, 435, 235/439, 467; 250/566

[56] References Cited

U.S. PATENT DOCUMENTS

| | | | |
|---|---|---|---|
| 4,006,343 | 2/1977 | Izura et al. ................. | 250/566 X |
| 4,418,276 | 11/1983 | Yatsunami .................. | 235/462 |
| 4,676,343 | 6/1987 | Humble et al. ............. | 235/437 X |
| 4,794,241 | 12/1988 | Carsner et al. ............. | 235/436 X |
| 4,920,255 | 4/1990 | Gabeler ...................... | 235/454 |
| 5,019,714 | 5/1991 | Knowles ..................... | 235/467 X |
| 5,202,557 | 4/1993 | Robertson .................. | 235/462 X |
| 5,252,814 | 10/1993 | Tooley ....................... | 235/462 X |

FOREIGN PATENT DOCUMENTS

3202820 10/1982 Germany.
0235011 9/1990 Japan ....................... 235/467

Primary Examiner—Donald Hajec
Assistant Examiner—Jeffrey R. Filipek
Attorney, Agent, or Firm—Foley & Lardner

[57] ABSTRACT

A bar code reader that shortens transport distances of articles and increases processing performance. The bar code reader comprises a conveyer for conveying articles to a predetermined area, a first to $n^{th}$ (wherein n is an integer equivalent to 2 or more) reader for reading information of a bar code attached on an article that is conveyed by the conveyer, an article location detector for detecting location in the read area of k articles conveyed by the conveyer, and a controller for controlling the first to $n^{th}$ readers so as to read each bar code attached on the first to $k^{th}$ articles conveyed to the read area based on an output signal of the article location detector.

5 Claims, 7 Drawing Sheets

BAR CODE READER FOR PROCESSING A PLURALITY OF BAR CODES IN A READ AREA

BACKGROUND OF THE PRESENT INVENTION

The present invention relates to a bar code reader reading a bar code attached or printed on an article.

Figure 9:
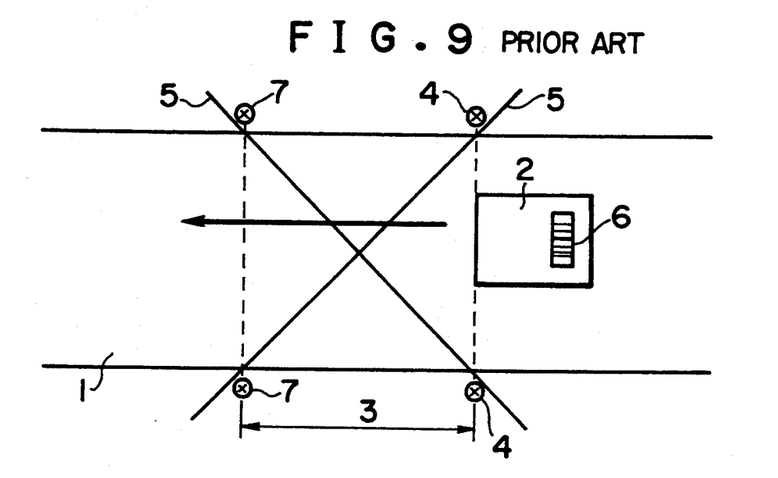
FIG. 9 is a figure showing a conventional bar code reader.
Figure 10:
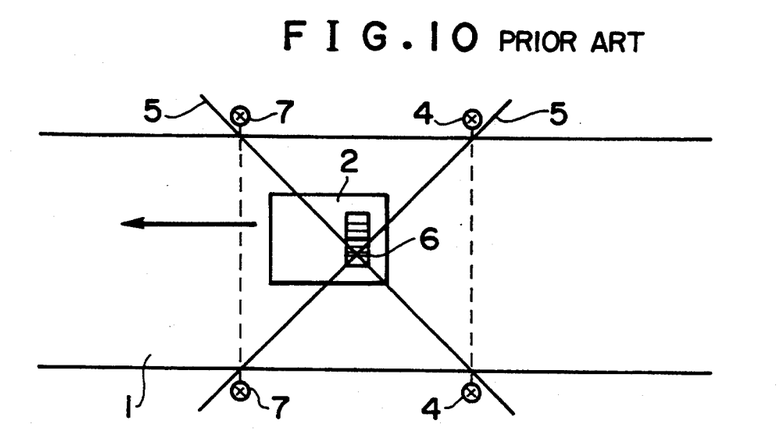
FIG. 10 is a figure showing a conventional bar code reader.

As shown in FIG. 9, a conventional bar code reader starts a reading operation when it detects, by the article detector 4 using a ray of light, that the tip of the article 2 conveyed by the belt conveyor 1 has come into the read area 3. Then, as shown in FIG. 10, it scans the bar code 6 on the article with the plurality of scanning lines 5 from the scanning means using a ray of light (not shown in the figure), reads information represented by the bar code 6 through receiving the reflected light of the scanning lines, and outputs the read result to an external device at the time when the article detector 7 using a ray of light has detected the end of the article 2.

One of the important parameters indicating the performance of a bar code reader is a number of readable bar codes per a unit time. This performance parameter indicates how many pieces of bar codes on articles can be read per a unit time, and the greater the number of readable bar codes, the greater the performance is.

Considering a reading operation of bar codes attached on articles conveyed one after another to the read area 3 by the belt conveyor 1. If the speed of the conveyor 1 is constant, the shorter the transport distance between articles is, the greater the number of articles that come into the read area 3. Therefore, the shorter the transport distance between articles is, the the greater number of bar codes that can be read, thus the performance of such a device is greater.

Figure 11:
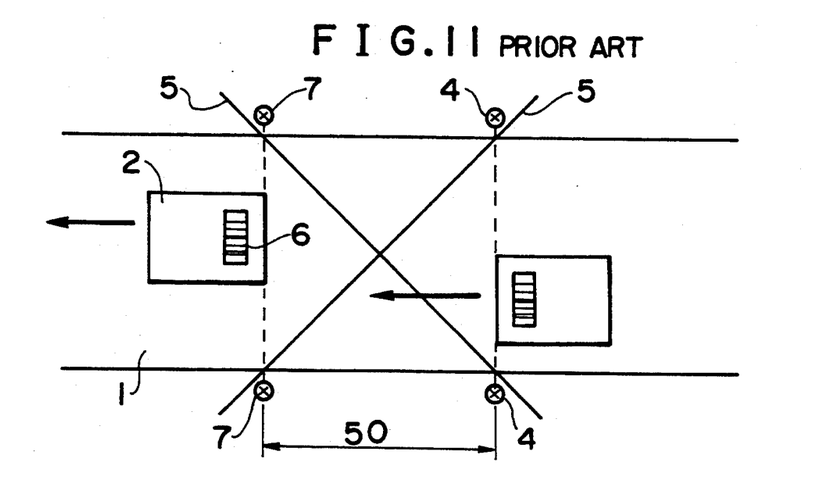
FIG. 11 is a figure showing a conventional bar code reader.

In a conventional bar code reader, however, when two or more articles come into the read area 3 the device can not decide which bar code on an article it should read, so that two or more articles can not be put in the read area 3 as shown in FIG. 11. Thus, the conventional bar code reader has a defect that the transport distance 8 can not be shorter than the length of the read area 3.

SUMMARY OF THE PRESENT INVENTION

The object of the present invention is to offer a bar code reader that can exactly perform reading and processing operation of a plurality of bar codes even if two or more articles are sent into a read area.

The above object is achieved by a bar code reader comprising:
a conveyance means conveying articles to a predetermined area,
a first to n-th (wherein n is an integer equivalent to 2 or more) read means reading information of a bar code attached on an article that is conveyed by the conveyance means,
an article location detection means detecting, in the read area, location of (n−k) (wherein k is an integer equivalent to 0 or more, and n−k≧2) pieces articles conveyed by said conveyance means,
a control means controlling to make the first to (n−k)-th read means read each bar code attached on the first to (n−k)-th articles conveyed to the read area based on an output signal of the article location detection means.

Further, in this bar code reader, it is possible to use a shading type detector or a light-reflection type detector for the article location detecting means.

Still further, the above article location detecting means can comprise an article existence detector detecting existence of an article, a speed detector detecting the moving speed of the conveyance means, an article location calculator detecting, in the read area, location of an article conveyed by the conveyance means based on output signals of said article existence detector and the speed detector.

It is desirable that the read means comprises a scanning means scanning a bar code attached on an article, a receiving means receiving information of the bar code from the scanning means through the bar code, a conversion means converting a signal from the receiving means to a predetermined symbol, a memory section storing conversion information converted to a predetermined symbol by the conversion means and outputting designated information to the control means.

Even still further, it is desirable that the bar code reader comprises an output means outputting information supplied from the memory section to outside.

Further, it is desirable that the pattern formed by the scanning lines from the scanning means is an X-shaped pattern.

Further, it is desirable that the control means is comprised to instruct beginning of conversion operation to the conversion means based on an output signal of the article location detection means, and instruct completion of conversion operation to the conversion means based on an output signal of the article location detection means.

Even still further, it is desirable that the conversion means is comprised to start conversion operation by an instruction of the control means, and complete conversion operation by an instruction of the control means.

Further, it is desirable that the control means is comprised to designate a necessary information among information stored in the memory section based on the output signal of the article location detection means and instruct the outputting means to output the designated information.

Explained as above, with the bar code reader by the present invention, a plurality of articles can be put in a read area and transport distance between articles, so that the number of readable bar codes can be increased.

DETAILED DESCRIPTION OF PREFERRED EMBODIMENT

Using figures, embodiment examples of the present invention are explained as follows.

In these embodiment examples, the case that n=2 and k=0 is supposed for explanation. The purpose of the supposition is to make explanation simple for better understanding. If the present invention is understood fully, it can be understood that the present invention can be applied to the case that n is an integer of 3, 4 or more, k is an integer of 1, 2.

Figure 1:
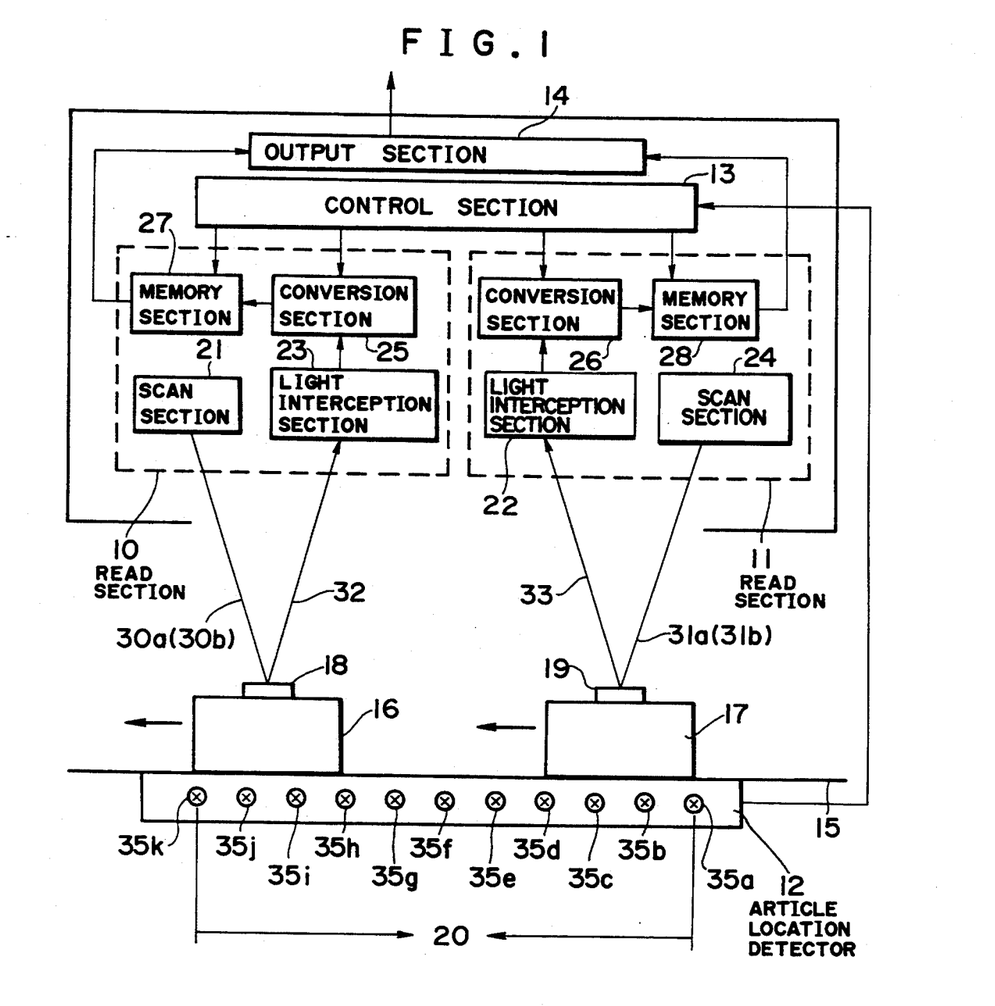
FIG. 1 is a figure to explain a configuration of an embodiment of the present invention.
Figure 2:
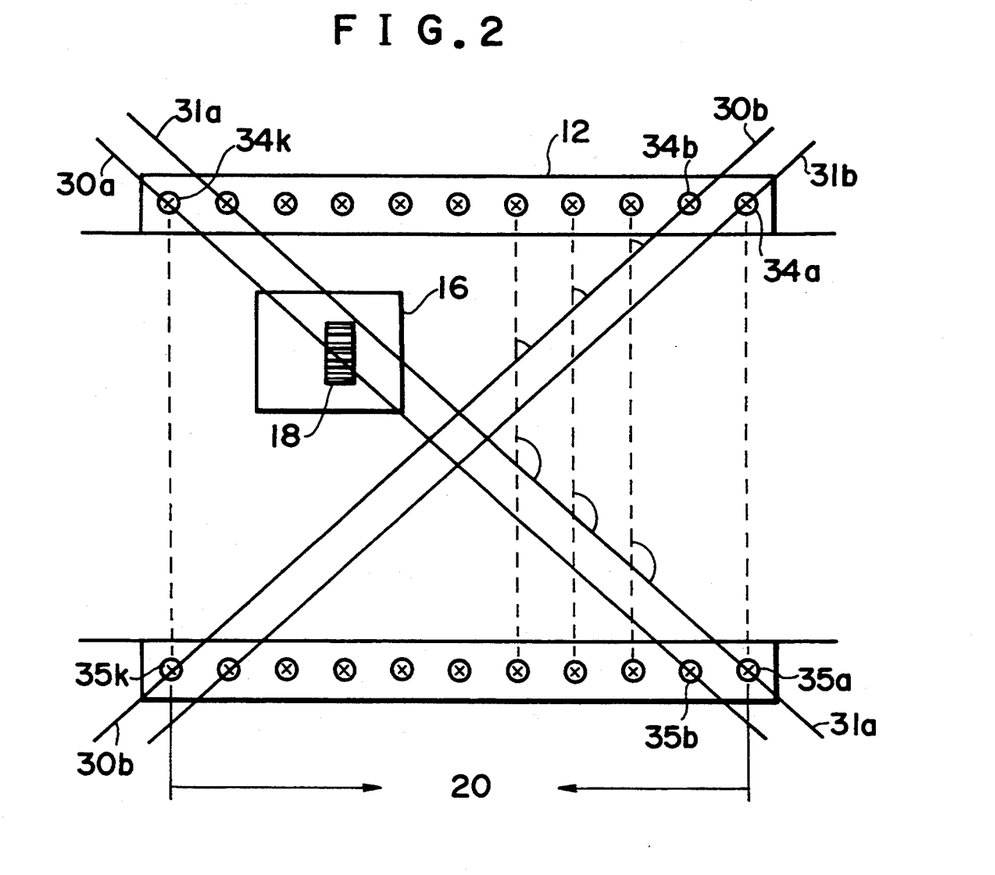
FIG. 2 is a figure to explain a configuration of an embodiment of the present invention.

FIG. 1 and FIG. 2 are figures to explain configuration of embodiment of the present invention. In the figures, 10 and 11 show read sections, 12 shows an article location detector, 13 shows a control section, 14 shows an output section, 15 shows a belt conveyor, 16 and 17 show articles, 18 and 19 show bar codes attached on the articles 16 and 17, 20 shows a read area.

The read sections 10 and 11 of the present invention comprises the scan sections 21 and 22, the light interception sections 23 and 24, the conversion sections 25 and 26, and the memory sections 27 and 28.

The scan sections 21 and 22 are equipped in parallel along the flow of the articles and comprise the scanning lines 30a, 30b, 31a and 31b. Athes scanning lines are irradiated to form an X-shaped pattern and scan the bar code labels, as shown in FIG. 2. Hereupon, the origin of the scanning lines 30a and 30b (similarly 31a and 31b) is a scanning line irradiated from the scan section 21 (22). Reflected with a mirror and so on (not shown in figures), 30a (31a) becomes 30b (31b). The light interception sections 23 and 24 are comprised to convert information on the bar code labels by receiving respective reflected lights 32 and 33 from the bar code labels. The conversion sections 25 and 26 convert the signals from the light interception sections 23 and 24 to information signals like letters or numerals, and output them to the memory sections 27 and 28. Further, the conversion sections 25 and 26 are comprised as the start and completion of the conversion operation and are controlled by an instruction of the control section 13. The information received by the memory sections 27 and 28 is stored in a memory (not shown in the figure), and desired information is output from information stored in the memory by an instruction of the control section 13. The control section 13 decides which read section of read sections 10 and 11 should read the bar code of the articles sent to the read area 20 based on an output signal from the article location detector 12. After the decision operation, the control section 13 instructs the conversion sections 25 and 26 both for the start and the completion of the conversion operation, selects only necessary information from information stored in the memories of the memory sections 27 and 28, and outputs selected information. The output information from the memory sections 27 and 28 is output to the outside with the output section 14.

The article location detector 12 is of a shading type detector composed such that the light sources 34a to 34k and the light interceptors 35a to 35k are located facing each other over the belt conveyor 15. If a ray of light irradiated from the light sources 34a to 34k to light interceptors 35a to 35k are shaded by an article conveyed with the belt conveyor 15, the light interceptors 35a to 35k output a signal informing this fact to the control section 13. Also, to make the control section 13 accurately which of possibly several article's bar code label is the bar code label that is being scanned by the scanning lines 30 and 31, the light sources 34a to 34k and the light interceptors 35a to 35k are arranged such that the line connecting the light source 34a and the light interceptor 35a, the line connecting the light source 34b and the light interceptor 35b, . . . , the line connecting the light source 34k and the light interceptor 35k are in a constant angle against the scanning lines 30 and 31, as shown in FIG. 2.

Next, referring to FIG. 3, FIG. 4, FIG. 5, FIG. 6 and FIG. 7, the specific movement of an embodiment of the present invention is explained. To make understanding of the movement of each embodiment of the present invention easy, the scanning lines 30b and 31b are omitted from the figures in explanation.

Figure 3:
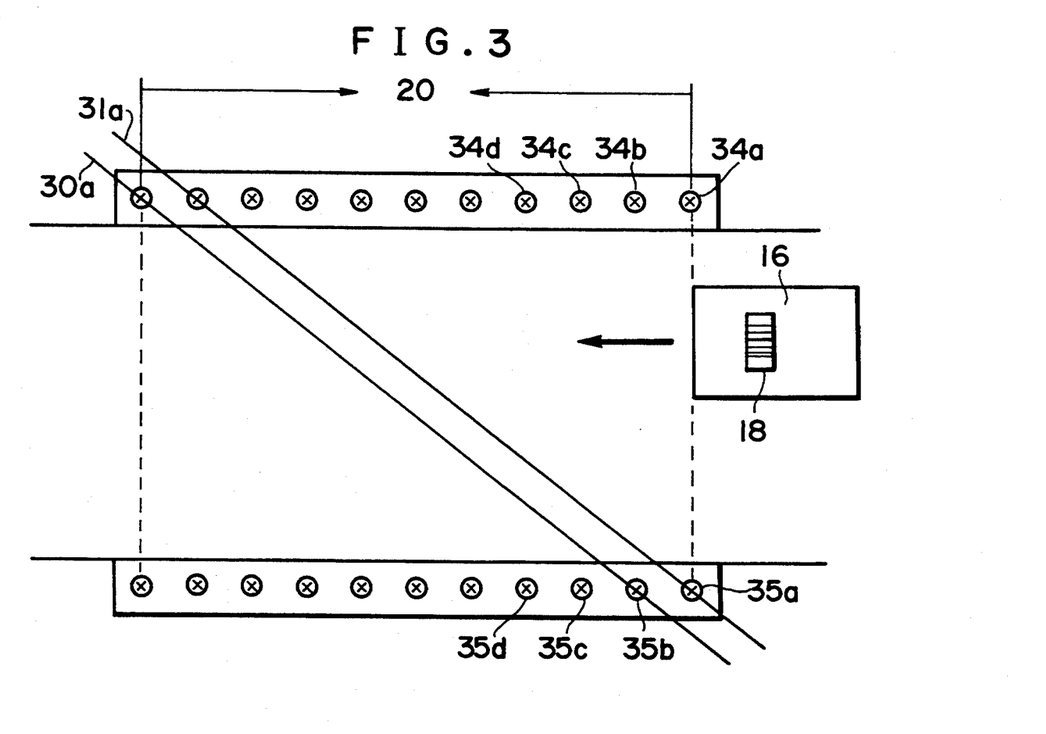
FIG. 3 is a figure to explain operation of an embodiment of the present invention.

As shown in FIG. 3, when the tip of the article 16 comes into the read area 20, the ray of light from the light source 34a is shaded, and the light interceptor 35a outputs a detection signal informing this fact to the control section 13.

The control section 13 decides based on the detection signal to make the read section 10 read the bar code label 18. Then after, if the light from the light source 34b is shaded in the way by the article 16 and a signal informing this fact is output to the control section 13 from the light interceptor 35b, the control section 13 instructs the conversion section 25 to start the conversion operation. Then, by receiving signals from the light interceptor 35c, 35d, . . . , the control section 13 confirms the place where the article 16 is located in the read area 20.

Figure 4:
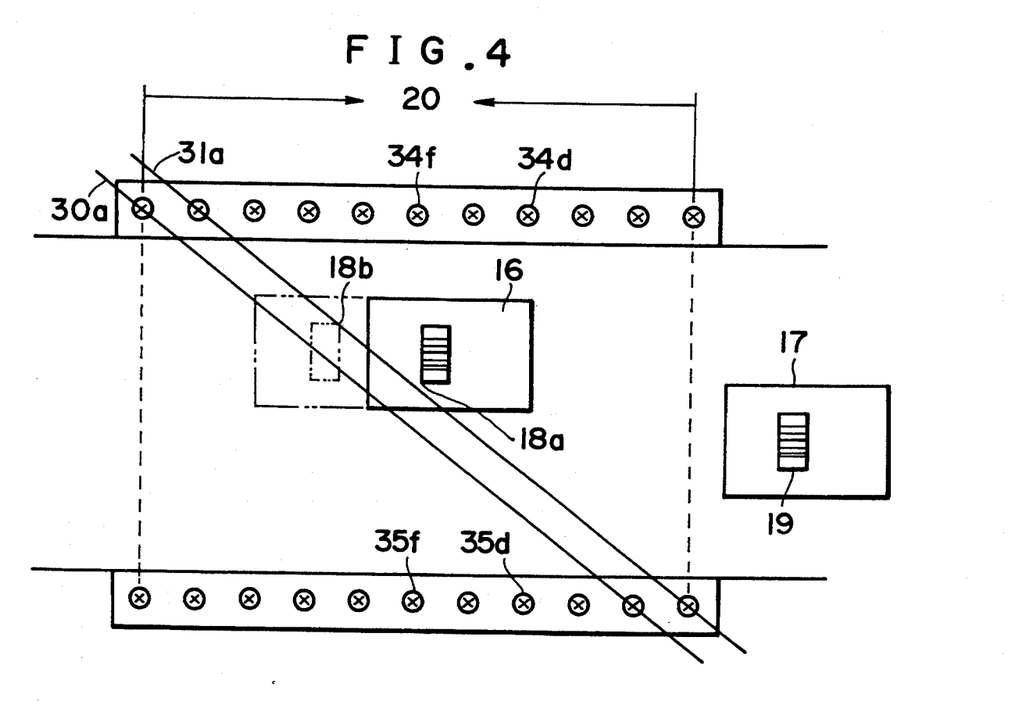
FIG. 4 is a figure to explain operation of an embodiment of the present invention.

Next, as shown in FIG. 4, the scanning operation is continued from the point of time when the tip 18a of the bar code label 18 has been started to be scanned by the scanning line 31a (the scanning line located to the right of the scanning line 30a), which corresponds to the point of time when the end of the article 16 has been detected by the light source 34d and light interceptor 35d, to the point of time when scanning of the end 18b of the bar code label 18 has been completed by the scanning line 31a, which corresponds to the point of time when the end of the article 16 has been detected by the light source 34f and the light interceptor 35f. The scanned information is stored in a memory of the memory section 28 after being converted to information in letters or numerals by the conversion section 26. At this time, the control section 13 confirms with the signals from the light interceptors 35d and 35f that the information stored in the memory of the memory section 28 is the information of the bar code label 18.

Figure 5:
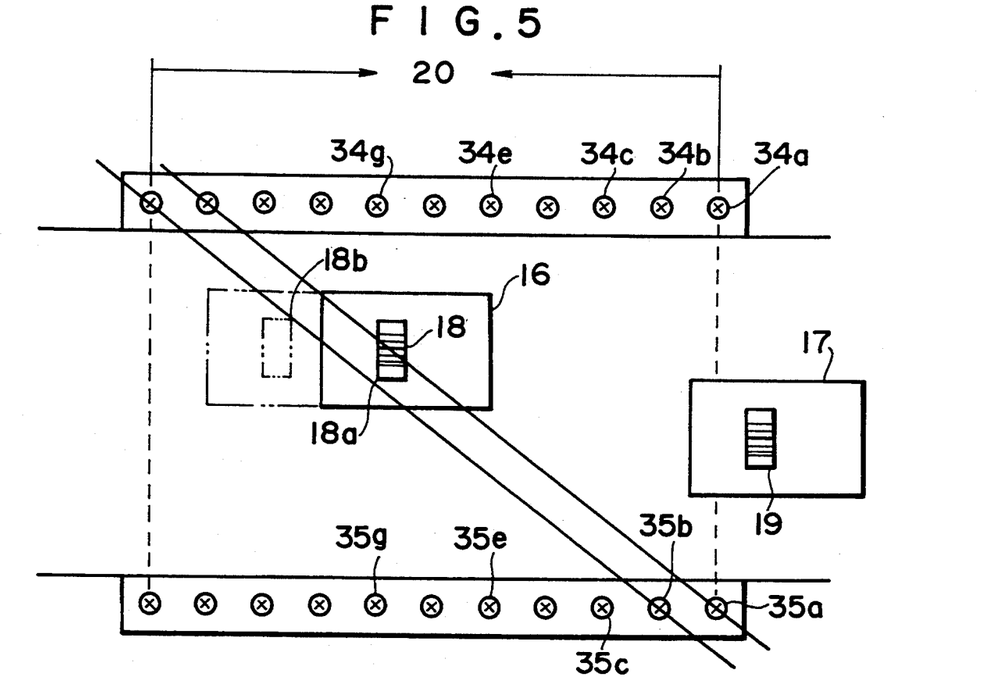
FIG. 5 is a figure to explain operation of an embodiment of the present invention.

Additionally in movement of the article 16, as shown in FIG. 5, the scanning operation is continued from the point of time when the tip 18a of the bar code label 18 has been started to be scanned by the scanning line 30a, which corresponds to the point of time when the end of the article 16 has been detected by the light source 34e and light interceptor 35e, to the point of time when scanning of the end 18b of the bar code label 18 has been completed by the scanning line 30a, which corresponds to the point of time when the end of the article 16 has been detected by the light source 34g and the light interceptor 35g. The scanned information is stored in a memory of the memory section 27 after being converted to information in letters or numerals by the conversion section 25. At this time, the control section 13 confirms with the signals from the light interceptors 35e and 35g that the information stored in the memory of the memory section 27 is the information of the bar code label 18.

When the tip of another article 17 comes in the read area 20, the ray of light from the light source 34a is shaded, and a signal informing the fact is output to the control section 13 from the light interceptor 35a. With this, the control section 13 decides to make the read section 11 read the bar code label 19, and instructs the conversion section 26 to start the conversion operation. Then, receiving signals from the light sources 35b, 35c, ..., the control section 13 confirms the place where the article 17 is in the read area 20.

Figure 6:
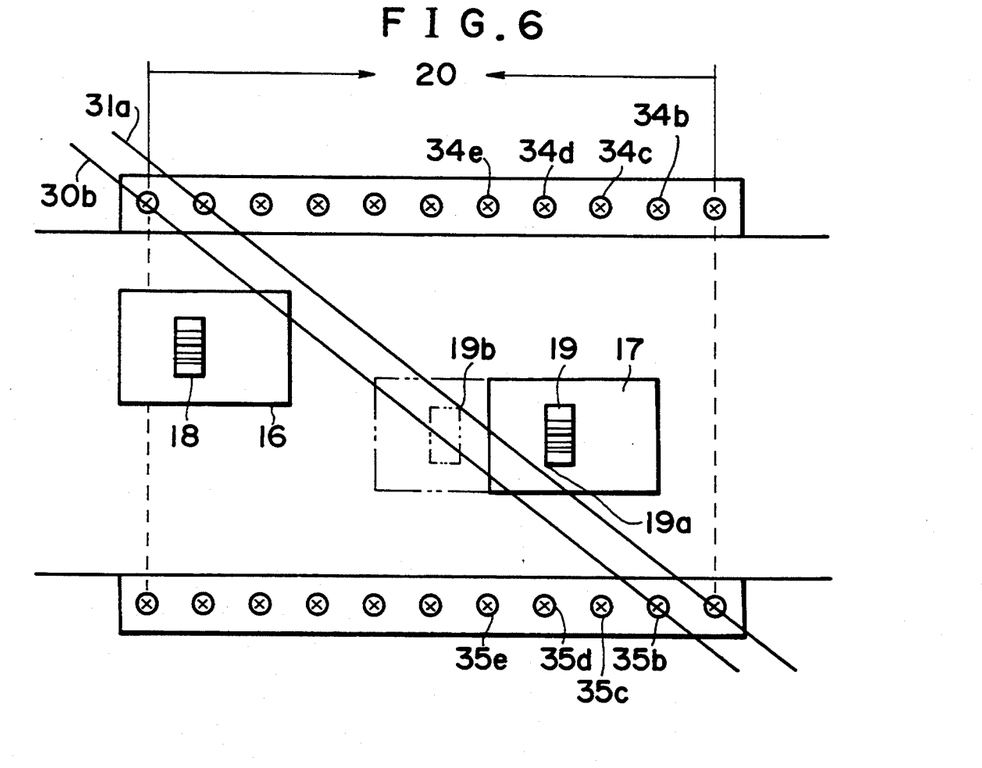
FIG. 6 is a figure to explain operation of an embodiment of the present invention.

Next, as shown in FIG. 6, the scanning operation is continued from the point of time when the tip 19a of the bar code label 19 has been started to be scanned by the scanning line 31a, which corresponds to the time when the end of the article 17 has been detected by the light source 34b and light interceptor 35b, to the point of time when scanning of the end 19b of the bar code label 19 has been completed by the scanning line 31a, which corresponds to the point of time the when the end of the article 17 has been detected by the light source 34d and the light interceptor 35d. The scanned information is stored in a memory of the memory section 28 after being converted to information in letters or numerals by the conversion section 26. At this time, the control section 13 confirms with the signals from the light interceptors 35b and 35d that the information stored in the memory of the memory section 28 is the information of the bar code label 19.

Figure 7:
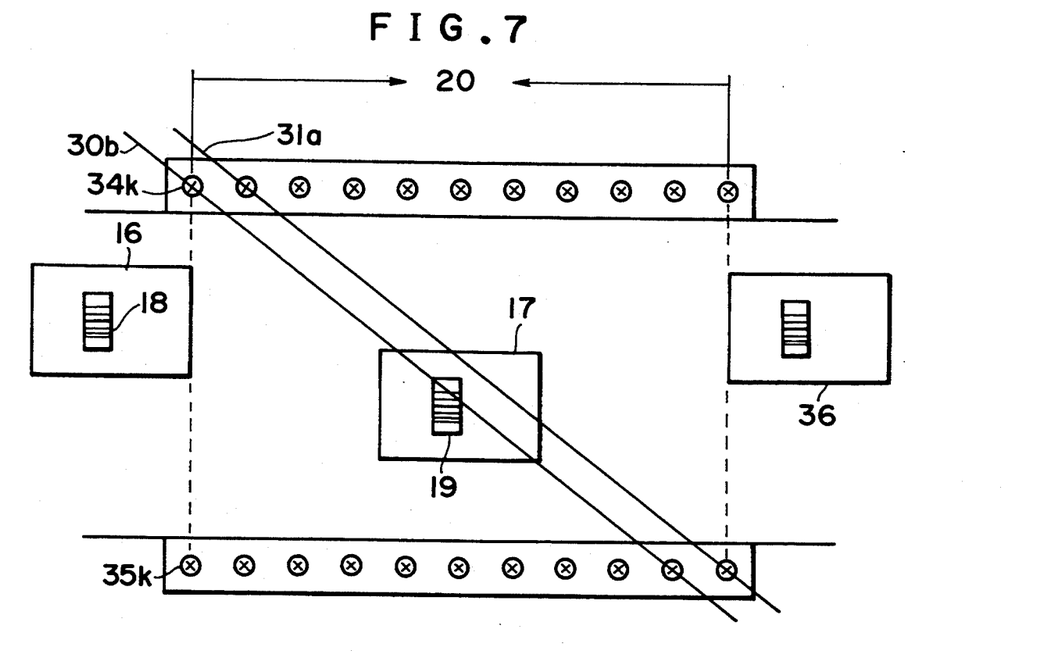
FIG. 7 is a figure to explain operation of an embodiment of the present invention.

Similarly, when the end of the article 17 has been detected by the light source 34k and light interceptor 35k, the control section 13 instructs the memory section 28 to output the information only of the bar code label 19, so that the memory section 28 outputs the information of the bar code label 19 and erases the information of the bar code label 18.

Continuously, the output section 14 outputs respective information of the memory sections 27 and 28 to outside.

As the result, the read section 10 reads only bar code label 18, so that the read section 11 reads only bar code label 19. Therefore, double reading can be avoided.

The article 36 newly coming into the read area is read with the read section 10 by the same operation as the above.

Like this, in the present invention, a plurality of read sections are provided and the read sections are controlled not to doubly read, so that if a plurality of articles are sent to the read area, problems can be avoided and a smooth operation is realized.

Further, in the above explanation on the embodiment examples, described light sources and light interceptors such as the light source 34i and the light interceptor 35i are not used. However, they may be used in some cases because scanning lines and a bar code label, depending on an entering location of an article, may cross at places other than the above-mentioned places.

Figure 8:
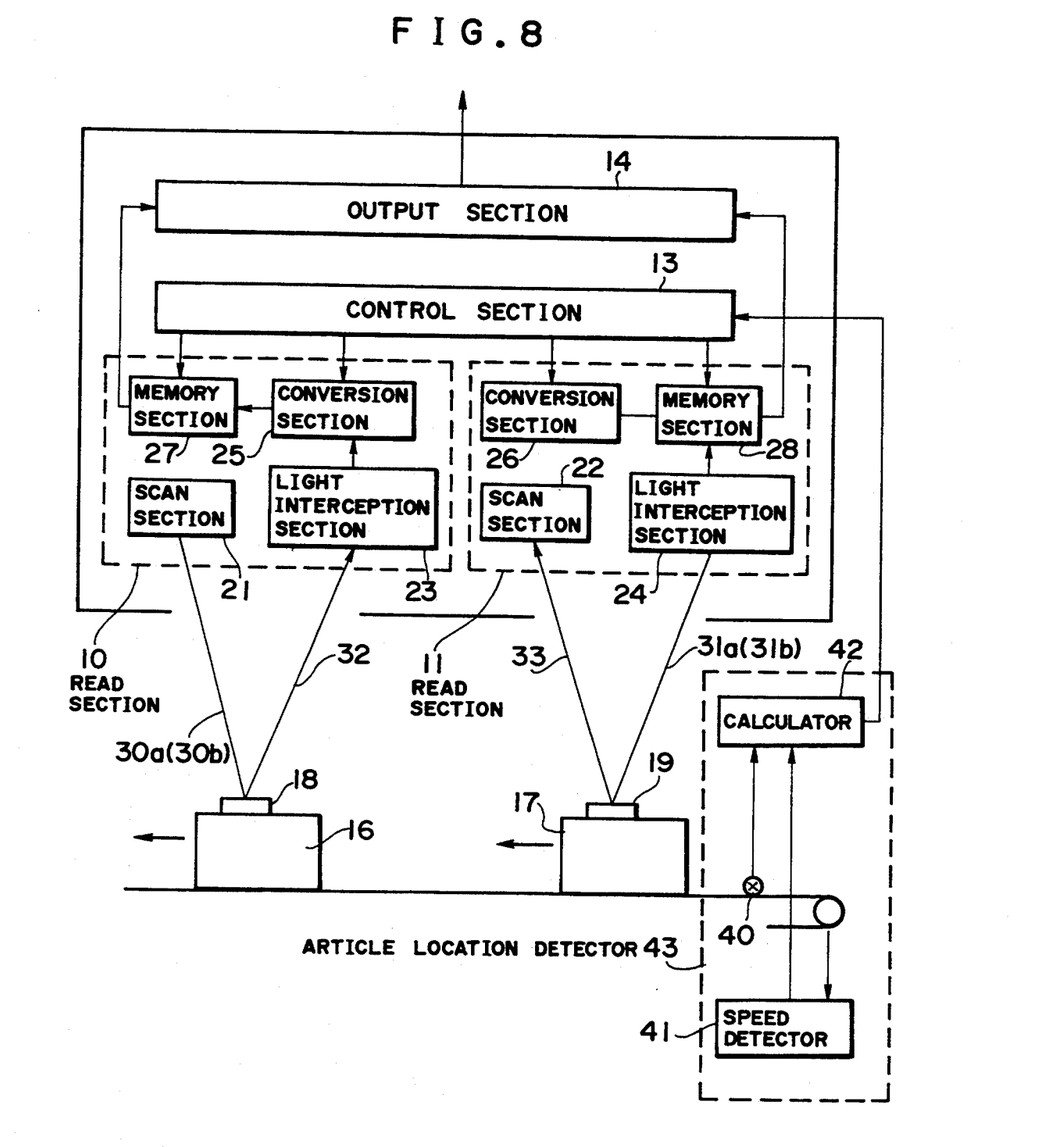
FIG. 8 is a figure showing a configuration of another embodiment of the present invention.

FIG. 8 is a figure showing another embodiment of the present invention. In this embodiment, an article location detector 43 is used. This comprises an article detector 40 detecting existence of an article using a couple of light source and light interceptor, a speed detector 41 detecting moving speed of a belt conveyor by detecting revolution speed of a driving roller of a belt conveyor 15, a calculator 42 calculating location of an article on the belt conveyor 15 using signals of the article detector 40 and the speed detector 41, instead of a plurality of couples of light sources and light interceptors shown in FIG. 1 and FIG. 2. That is, if the article detector 40 detects the tip of an article conveyed with the belt conveyor 15, the calculator 43 calculates the location of the article that is constantly moving using a signal from the speed detector 41, the location of the article on the conveyor 15 can be calculated. If comprised such that the location information signal of the article is supplied to the control section 13, the same operation as the above embodiment can be performed and the same effect can be produced.

Further, in the explanation of the above embodiment, to make understanding easy, the number of the scanning lines is two, so that the number of articles in the read area is also limited to two. However, if there are n pieces of scanning lines and read sections corresponding to the scanning lines, the number of articles in the read area can be up to n pieces.

Additionally, the article location detector 13, without any limitation to be a light-shading type, can be of so-called reflection type irradiating light to an article transport path and detecting existence of articles using reflected light of the article.

What is claimed is:

1. A bar code reader comprising:
   a) a conveyance means for conveying articles to a read area;
   b) a first to $n^{th}$ read means, wherein n is an integer greater than one, each of said read means comprising:
      1) a scanning means for scanning a bar code attached on an article conveyed by said conveyance means;
      2) a receiving means for receiving scanned information corresponding to said scanned bar code from said scanning means;
      3) a conversion means for converting said scanned information to bar code information;
      4) a memory means for storing said bar code information;
   c) an article location detection means for detecting a location in said read area of k articles conveyed by said conveyance means; and
   d) a control means for controlling a reading operation of each of said first to $n^{th}$ read means based on an output signal of said article location detection means, wherein
   e) each of said first to $n^{th}$ read means scanning bar codes attached on said k articles in said read area and storing bar code information corresponding to said bar codes for each of said k articles in said memory means; and
   f) said control means controlling said first to $n^{th}$ read means so that each of said first to $n^{th}$ read means outputs one of said bar code information corresponding to said bar code for one of said k articles stored in said memory means therein and wherein each of said bar code information corresponds to a different one of said k articles in said read area.

2. The bar code reader of claim 1, wherein said article location detection means comprises a shading type detector.

3. The bar code reader of claim 1, wherein said article location detection means comprises a light-reflection type detector.

4. The bar code reader of claim 1, wherein said article location detection means comprises:
- an article existence detector for detecting an existence of an article;
- a speed detector for detecting a moving speed of said conveyance means; and
- an article location calculator for detecting a location in said read area of an article conveyed by said conveyance means based on output signals of said article existence detector and said speed detector.

5. The bar code reader of claim 1, wherein said memory means deletes all bar code information stored within said memory means after outputting said bar code information as indicated by said control means.

* * * * *